United States Patent
Pollack et al.

(10) Patent No.: US 6,493,733 B1
(45) Date of Patent: Dec. 10, 2002

(54) METHOD FOR INSERTING INTERACTIVE HTML OBJECTS INTO AN ELECTRONIC FILE

(75) Inventors: Joshua Michael Pollack, Kirkland; Warren Burch, Redmond; Bill Linzbach, Bothell; Anil K. Yadav, Issaquah, all of WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 09/602,124

(22) Filed: Jun. 23, 2000

(51) Int. Cl.$^7$ .............................................. G06F 17/21
(52) U.S. Cl. ................................... 707/513; 707/501.1
(58) Field of Search ............................. 707/501.1, 513, 707/530, 531; 345/733, 740, 749, 760

(56) References Cited

U.S. PATENT DOCUMENTS

| | | | | |
|---|---|---|---|---|
| 5,724,595 A | * | 3/1998 | Gentner | 707/501.1 |
| 5,845,299 A | * | 12/1998 | Arora et al. | 707/513 |
| 5,956,736 A | * | 9/1999 | Hanson et al. | 707/513 |
| 5,995,101 A | * | 11/1999 | Clark et al. | 345/711 |
| 6,151,609 A | * | 11/2000 | Truong | 707/505 |
| 6,178,432 B1 | * | 1/2001 | Cook et al. | 707/513 |
| 6,266,684 B1 | * | 7/2001 | Kraus et al. | 707/513 |
| 6,278,448 B1 | * | 8/2001 | Brown et al. | 345/866 |
| 6,321,242 B1 | * | 11/2001 | Fogg et al. | 707/513 |
| 6,343,302 B1 | * | 1/2002 | Graham | 707/501.1 |
| 6,362,840 B1 | * | 3/2002 | Burg et al. | 345/835 |

OTHER PUBLICATIONS

Denise Tyler, *Laura Lemay's Web Workshop, Microsoft FrontPage(TM)* 97, Sams, Macmillan Computer Publishing, Jan. 1997, pp. 11–31.*
SoftQuad Hot Metal Pro(TM) 3.0 User Manual, SoftQuad Inc., 1996, pp. 5–23 and 119–127.*

* cited by examiner

Primary Examiner—Stephen S. Hong
(74) Attorney, Agent, or Firm—King & Spalding

(57) ABSTRACT

A method for automatically inserting an interactive HTML object into an existing web page without the user having any knowledge of programming in HTML or server-side scripts. The method is contained in a utility and referred as "WEB Content Customization" (WCC). The WCC utility is launched from a web authoring tool, such as a desktop publishing computer program, when the user selects the option to insert interactive HTML object into their web page. The WCC utility provides a user with the ability to customize their web page by inserting interactive HTML object using the same web site authoring computer program module, such as a desktop publishing computer application program that was used to create the web page. The WCC utility creates a dialog box in the web-authoring tool and opens the remote site in the dialog box. The dialog contains at least one window that displays a list of the available interactive HTML object that the user may select. Once the user selects an interactive HTML object, the WCC utility then transfers the associated block of HTML code from the remote site to the web-authoring tool, where the block of HTML is inserted directly into the electronic file.

13 Claims, 10 Drawing Sheets

METHOD FOR INSERTING INTERACTIVE HTML OBJECTS INTO AN ELECTRONIC FILE

TECHNICAL FIELD

The invention generally relates to developing hypertext mark-up language ("HTML") computer code, and more specifically relates to automatically inserting HTML computer code for interactive HTML objects within a computer application program.

BACKGROUND

With the use of the Internet increasing on a daily basis, the appearance of new web sites has increased at a seemingly exponential rate. Many of these new web sites are authored by individuals with little or no experience in programming Hypertext Markup Language ("HTML"). However, web site authors want their web site to look as if a professional HTML programmer designed it. Unfortunately, hiring a professional HTML programmer can be expensive and beyond the financial means of most individuals.

One method to make a web site look like it was designed by a professional, as well as make it more useful to users, is to add interactive HTML object. Interactive HTML objects may be graphics or text, such as a marquee or a button to open a URL. However, creating interactive HTML object from "scratch" is not a simple task and is typically beyond the ability of most web site authors. For example, many interactive HTML objects require the support of server-side scripts on the web server (e.g., Active Server Pages ("ASPs"), Computer graphics interface ("CGI")-scripts, etc.). Normally, these server-side scripts are complex to write and are typically beyond the ability of the average web site author.

Furthermore, if the server-side scripts for the interactive HTML object are written incorrectly, they can pose a serious security threat for the Internet Service Provider ("ISP") servers. As a result, many ISPs often require a premium price for hosting a web site with server-side scripts. Additionally, the HTML code that is required to interact with the server-side scripts is equally complex for the average web site author to write.

As a result, many companies have created web site authoring tools, which claim to facilitate the creation of HTML objects without requiring the web site author to have any knowledge of HTML or server-side script programming. Unfortunately, these tools are often unable to produce the HTML code required for interacting with server-side scripts. Furthermore, the tools that do support this type of HTML use outdated functions, such as "Insert HTML Code Fragment," which require the web site author to have a working knowledge of programming HTML and are generally not "What You See Is What You Get"("WYSIWYG").

One method to help web site authors insert interactive HTML object into their web pages was to provide the HTML code for the interactive HTML object over the Internet. One such web site that provides interactive HTML object over the Internet is LinkExchange operated by Microsoft Corporation of Redmond, Wash. However, the LinkExchange service only partially solves this problem. LinkExchange will host all the necessary scripts on the server, so users are not faced with the complexity and expense of creating these scripts themselves. But LinkExchange only provides users with minimal help in creating web pages that interact properly with the server-side scripts. Upon completion of a registration process, LinkExchange provides the web site author with a customized block of HTML that corresponds to an interactive HTML object. However, the task of inserting the HTML code into the web page is left up to the user. Unfortunately, this can often be a difficult task. Specifically, the user must go through a multi-step process to incorporate the interactive HTML object into the web page. For example, the user must first create the web page in a web-authoring tool. Next, the author must register with the LinkExchange (or any similar interactive HTML object) web site. Finally, the user must incorporate the provided HTML code into their web page by manually inserting the block of customized HTML code into the existing HTML code.

Another problem with using the HTML interactive code web sites is that the user cannot access the web site from the application program they are using to develop their web page. The user must first exit the web-authoring tool, and open an Internet browser application program, such as INTERNET EXPLORER, developed by Microsoft Corporation of Redmond, Wash., to access the HTML code server web site. Once the user retrieves the interactive HTML object, they must manually insert the HTML code themselves into the web page. Then, if the user wants to view the interactive content, they must save the web page in the authoring application and open the web page in the Internet browser application program. This process of having to use a separate Internet browser application to view the interactive HTML object in the user's web page, is both time consuming and confusing to the average web page developer. This, in turn can lead to users making numerous errors in building their web pages and ultimately leads to user frustration.

Thus, there is a general need in the art for a more convenient and efficient method for inserting interactive HTML object into a web page. There is a further need for a method for inserting interactive HTML objects into a web page, which automatically retrieves all the required HTML code from the HTML interactive web site with out requiring any user intervention or knowledge of HTML or server-side script programming.

SUMMARY OF THE INVENTION

The present invention meets the above-described needs in a software utility for inserting an interactive HTML object into an electronic file, such as an Internet web page. Specifically, the utility allows a user to select an interactive HTML object from a remote HTML code server web site. The utility then automatically inserts the HTML code associated with the interactive HTML object into the user's web page.

Generally described, a WEB Content Customization ("WCC") utility allows a user to automatically insert an interactive HTML object into an existing web page.

First, the user opens the HTML file, such as a web page, in a web-authoring tool. The user first selects the option to insert an HTML object into the HTML document. Next, the WCC utility retrieves the URL address of a remote site that contains interactive HTML objects. The WCC utility then automatically establishes a link with the HTML code service web site. Next, the user selects an interactive HTML object and the WCC utility retrieves a block of HTML code associated with the selected interactive HTML object. Finally, the WCC utility automatically inserts the interactive HTML object into the electronic file in the web-authoring tool.

More specifically, the WCC utility creates a dialog box in the web-authoring tool and launches an HTML rendering engine in the dialog box. The WCC utility then opens the HTML code service web site in the rendering engine in the dialog box. The dialog box contains at least one window that displays a list of the available interactive HTML object that the user may select. Once the user selects an interactive HTML object, the WCC utility then transfers the associated HTML computer code from the remote site to the web-authoring tool, where the WCC utility automatically inserts the HTML computer code into the electronic file.

The WCC utility may also store an identifying indicia, such as a uniform resource locator (URL), associated with the web site that provided the interactive HTML object. When the user wishes to reconfigure the interactive HTML object, this URL is used by the HTML rendering engine to retrieve the appropriate web page. This removes the need for the user to remember a complex sequence of steps required to reconfigure the object. Also, this URL may contain data that identifies the user or identifies the particular object. This allows the program to bring the user to the relevant web page immediately, bypassing or simplifying the log-on process.

Furthermore, the web site providing the interactive content includes some client-side script (such as JavaScript or VBScript) that automatically delivers the HTML to the authoring application. The WCC utility then inserts the HTML data into the electronic file. The position of the HTML interactive object in the electronic file may be provided by the HTML code service web site or may be specified by the user.

The HTML code service web site providing the interactive HTML object may choose to specify predetermined dimensions for the content. In this case, the authoring application will reserve an area on the page of the correct size. If the web site does not specify dimensions, the authoring application will allow the size of the content to be adjusted by the user through the use of an input device.

The Webster providing the interactive object contains a block of JavaScript specially designed to communicate directly with the host application (the web-authoring tool). This communication takes place via "OLE automation". Those skilled in the art will be familiar with OLE automation, as a standard mechanism used by scripts (such as those contained in web pages) to interact with other objects. This allows the HTML code service web site to automatically download a block of HTML code associated with the interactive HTML object directly into the electronic file open in the web-authoring tool. This provides several advantages over the previous methods of inserting HTML objects into electronic files. First the user never sees the block of code associated with the interactive HTML object . The WCC utility allows for the block of HTML code to be downloaded to the web-authoring tool and inserted into the electronic file without the user ever viewing the block of code. Secondly, the WCC utility reduces the complexity inserting interactive HTML objects into files by running the HTML rendering engine within the web-authoring tool That the invention improves over the drawbacks of web authoring systems for creating interactive HTML object and accomplishes the advantages described above will become apparent from the following detailed description of the exemplary embodiments and the appended drawings and claims.

DETAILED DESCRIPTION OF EMBODIMENTS OF THE INVENTION

Figure 1:
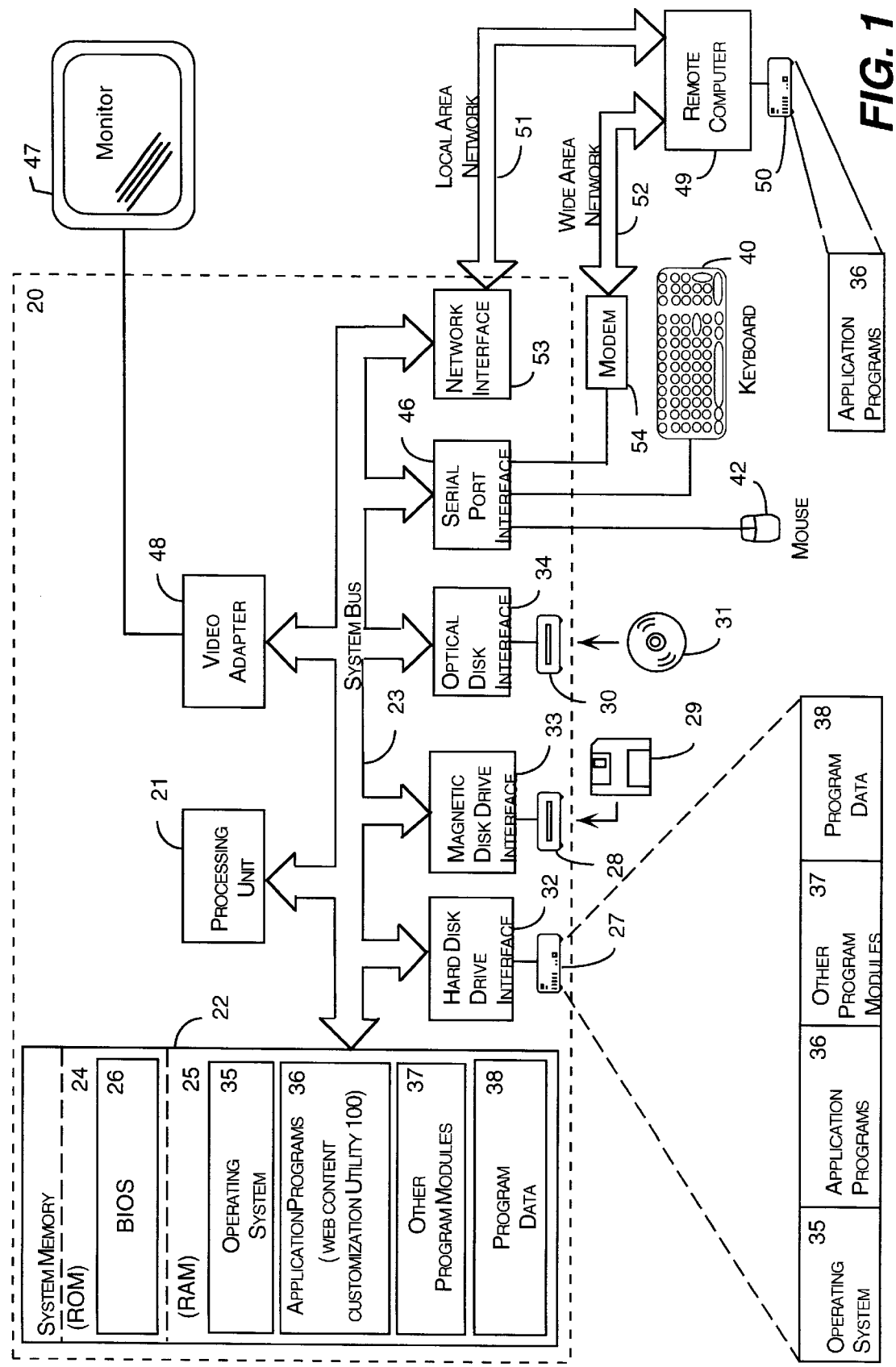
FIG. 1 is a block diagram of a personal computer that provides the operating environment for an embodiment of the present invention.

The present invention may be embodied in a software utility, which may be referred to as the "WEB Content Customization" (WCC) utility. An embodiment of this utility will be incorporated into Microsoft's PUBLISHER 2002 software system. Briefly described, the WCC utility allows a user to automatically insert an interactive HTML object into an existing web page without the user having any knowledge of programming in HTML or server-side scripts. The WCC utility is launched from a web-authoring tool, such as Microsoft's PUBLISHER 2002, when the user selects the option to insert interactive HTML object into their web page.

The term software "utility" typically denotes a software function, routine, or dynamic link library (DLL) that is configured as an independent object or module accessible by other software modules through a pre-defined set of interfaces. However, a "utility" within the meaning of this specification may also be incorporated into a computer operating system or application program, such as a web-authoring tool. The invention therefore, encompass any type of software module or system that performs the methods of the WCC utility described in this specification, and is not limited to a particular object configuration, such as a dynamic link library (DLL). In addition, although the present invention is described in the context of a desktop publishing program, those skilled in the art will appreciate that the invention is applicable to other programs that allow a user to edit a web page, such as dedicated web authoring tools, word processing programs, presentation programs, drawing programs, spreadsheet programs, and the like.

The WCC utility provides a user with the ability to customize their web page by inserting interactive HTML objects using the same web site authoring computer program, such as a desktop publishing computer program that was used to create the web page. The WCC utility first receives a user command to insert an interactive HTML object into an existing web page. Typically, interactive HTML objects require some level of support on a web-based server. For example, most interactive HTML objects rely on server-side scripts. Server-side scripts, such as Microsoft's Active Server Pages are text files that contain not only text and HTML tags, as in standard web documents, but also contain commands written in scripting language that can be carried out on the server. This allows a web developer to add interactivity to a document or to customize the viewing or delivery of information to the client without worrying about the platform the client is running. That is, the use of server-side scripting allows the server to process and store client input, and allows the client to interact with server-side databases, etc. at the server site. This reduces the amount of information that must be stored at the client's site.

Next, the user selects an insert HTML content option from within the web-authoring tool. The web-authoring tool then opens a dialog box and launches an HTML rendering engine, such as Microsoft's TRIDENT module, within the dialog box. The TRIDENT module is an ActiveX control that manages the downloading, parsing, and displaying of web pages on a local computer.

To host the TRIDENT module, the web-authoring tool must support a collection of Object Linking and Embedding ("OLE") Interfaces. The key interface used in this invention is known as IDocHostUIHandler. The IDocHostUIHandler interface contains a method, which is well known in the art, called GetExternal that allows the TRIDENT module to generate a connection between the web authoring tool and scripts contained in a web page.

After the user selects the insert HTML code option, the WCC utility opens a dialog box within the web authoring application. The dialog box contains an opening page, which comprises a list box that contains a list of URLs associated with various HTML code service web sites from which the user may retrieve interactive HTML objects. The user may edit the URLs, such as such as delete an entry or edit a specific entry using standard editing techniques. Also, the user may add new URLs that are associated with new HTML code service web sites as they become available.

Once the user has selected a URL, the WCC utility launches the TRIDENT component in a dialog box within PUBLISHER 2002 and downloads a first page of the HTML code service web site associated with the selected URL. The first page of the web site may include a list box comprising the interactive HTML objects that are presently available for the user to download. The user may then select an interactive HTML object from the list to insert into their web page. Once the user has selected an interactive HTML object, the web site then displays a series of registration pages for the user to respond to in order to receive the block of HTML code associated with the interactive HTML interactive object.

Alternatively, instead of displaying a list box containing the URLs associated with various HTML code service web site, the WCC utility may open a web site whose URL is "hard coded". Upon receiving a user command to insert an interactive HTML object, the WCC utility may directly launch the TRIDENT module and display the opening page of an HTML interactive code service web site, such as LinkExchange. Thus, whenever the user selects to insert an HTML interactive content data into their web page, the WCC utility automatically downloads the opening page of the HTML interactive code service web site into a dialog box running within the web development application.

Once the registration process is complete, the web site providing the object displays the last web page in the TRIDENT window. This web page contains a block of client-side script designed to communicate directly with the host application, PUBLISHER 2002. TRIDENT executes this script, allowing the HTML code to be directly inserted into the user's web page open in PUBLISHER 2002 and also controls how the interactive HTML object will be displayed. Those skilled in the art will appreciate that any script programming language, such as VBSCRIPT, may be used without altering the effect or scope of this invention.

As an example, a user may wish to include an interactive HTML object on their web site that allows remote users to sign up for an electronic mailing list Various web sites provide this type of object, often called a ListBot, including the ListBot web page hosted at the LinkExchange web site, which is operated by Microsoft Corporation of Redmond, Wash. To work in conjunction with this invention, the ListBot web page typically includes HTML source code similar to the following:

<html>
<head>
<script>
<function UpdateObject>
{
window.external.WebComponent.HTML="Click here to sign up!"+"<form action='http: / /www.listbot.com/ reg.asp'>"<input type='text'name='email'>"+"<input type='submit' value='Sign Me Up!'>"+<input type= 'hidden' value='19228'>+"</form>";
window.external.WebComponent.URL="http: / /www.listbot.com/config.asp&ID=19228";
window.external.CloseWindow;
}
</script>
</head>
<body>
Click here to add the ListBot
signup widget to your page <br>
<input
type="button"
onclick="UpdateObject" value="OK">
</body>
</html>

The HTML code prompts the user to select an "OK" button to download the ListBot signup widget from the web pate. Upon selecting the "OK" button, the HTML activates the client-side script, which in the above example contains the UpdateObject function. This function contains a call to "windows.external" that instructs the TRIDENT module to run the GetExternal method, which opens a connection directly between the web authoring tool and the web page. The direct connection allows the block of HTML code to be directly transferred into the user's web page currently open in the web development application.

Previously, if a user wanted to see how the interactive HTML object would look in the web page, the user had to incorporate the HTML code into their HTML document, save the document as a web page, and open the web page using an Internet browser application program. By allowing the user to see a graphical representation of a selected interactive HTML object, the WCC utility provides an advantage over previously existing methods of inserting interactive HTML objects into a web page by reducing both the time and complexity required to produce a professional looking web page. For example, using the WCC utility, there is no need for the user to continually insert the HTML code into their web page and view it in a separate web browser. Furthermore, the WCC utility reduces the possibility of the user introducing errors in the HTML document, by eliminating the need for direct editing of the HTML.

Once the user is satisfied with how the interactive HTML object will appear in the web page, they complete a registration process with the HTML code server web site for each interactive object inserted into the web page. The HTML code server then provides a URL that points to a web site for reconfiguring the interactive HTML object. Typically, as part of the registration process, the user answers a series of questions, which affect how the interactive object will look in the user's web site. Configuration information for each interactive HTML object is stored in a database at the HTML Code Service Web Site. The configuration of information is normally accessed through individual web page on the web server that was used to create the object. The WCC utility then retrieves the URL associated with the web page, which contains the configuration data and displays the page in the TRIDENT dialog box, hosted by the web-authoring tool. Therefore, in order for the user to either reconfigure or update the interactive HTML object, the user must access the specific web page that contains the configuration data. The user may access the web page containing the configuration data in one of two ways. First the user may double click on the interactive HTML object when the web page is open in the web authoring tool. This causes the WCC utility to retrieve the URL and open the web page containing the configuration data.

Additionally, the HTML code server web site may provide the dimensions of the HTML interactive element to WCC utility. These dimensions are directly imported into the user's web page and allow the web-authoring tool to accurately place the interactive HTML object on the web page. Also, by providing the dimension of the object, the web-authoring tool will prevent the user from resizing the object. However, if the HTML code service web site does not provide the dimensions of the object, the web-authoring tool will allow the user to resize the interactive element. Typically, the dimensions are described in terms of the number of pixels for both the width and height of the interactive object.

Finally, once the user has selected the interactive HTML object, the WCC utility retrieves a block of HTML code that corresponds to the interactive HTML object and automatically inserts the block of HTML code into the user's HTML document. Retrieval of the block of HTML code is facilitated by the WCC utility calling a block of client-side script that is contained at the web page associated with the interactive HTML object. Additionally, the web site providing the interactive object may provide a collection of supporting files associated with the interactive HTML object such as a movie file, a video file, an audio file, an automation file, or the like. The web-authoring tool will store these supporting files, and publish them to the user's web server along with the rest of the user's web pages.

The WCC utility relieves the user from having to manually cut and paste the HTML code into his web page or write the HTML code from scratch. The WCC utility provides advantages over the previous methods by simplifying the method of inserting an interactive HTML object into a web page. Using the WCC utility, the user only needs to select the desired interactive HTML object from an HTML code service web site and the HTML code is automatically downloaded into the user's HTML document. This obviates the user's need to have any knowledge of HTML or server-side script programming to add an interactive HTML object to their web page.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as the WCC utility 100, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB).

A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiments

Figure 2:
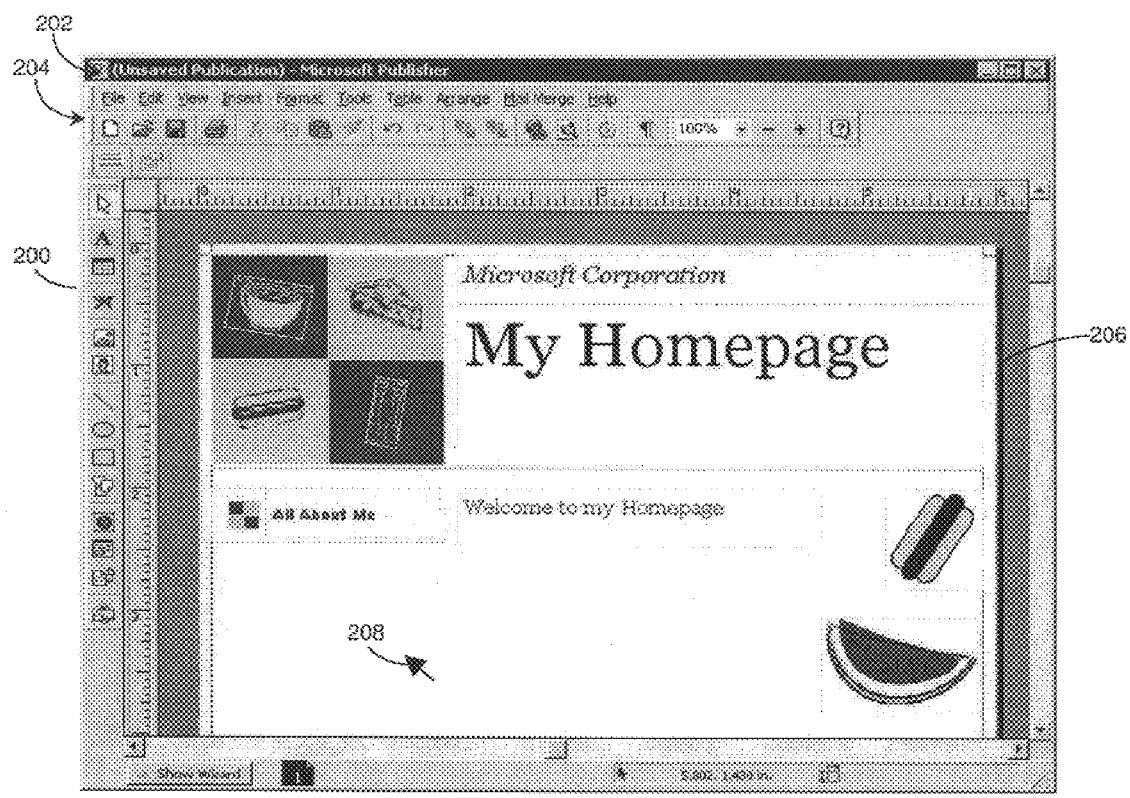
FIG. 2 is a screen display illustrating a technique for displaying an HTML electronic file opened in an authoring computer application.

FIG. 2 is an illustration of the window 200 showing a typical prior art screen display in Microsoft's PUBLISHER 2000 desktop publishing program. A window 200 includes a title bar 202 and a drop-down menu bar 204. The contents of the web-authoring tool are viewed in a viewing area 206, which in this illustration contains a web page 206. The web page 206 contains objects such as text, graphics, pictures, videos, audio sounds, clip art and the like. The window 200 also contains a pointing device 208, which allows the user to select objects within the window or issue commands.

Figure 3:
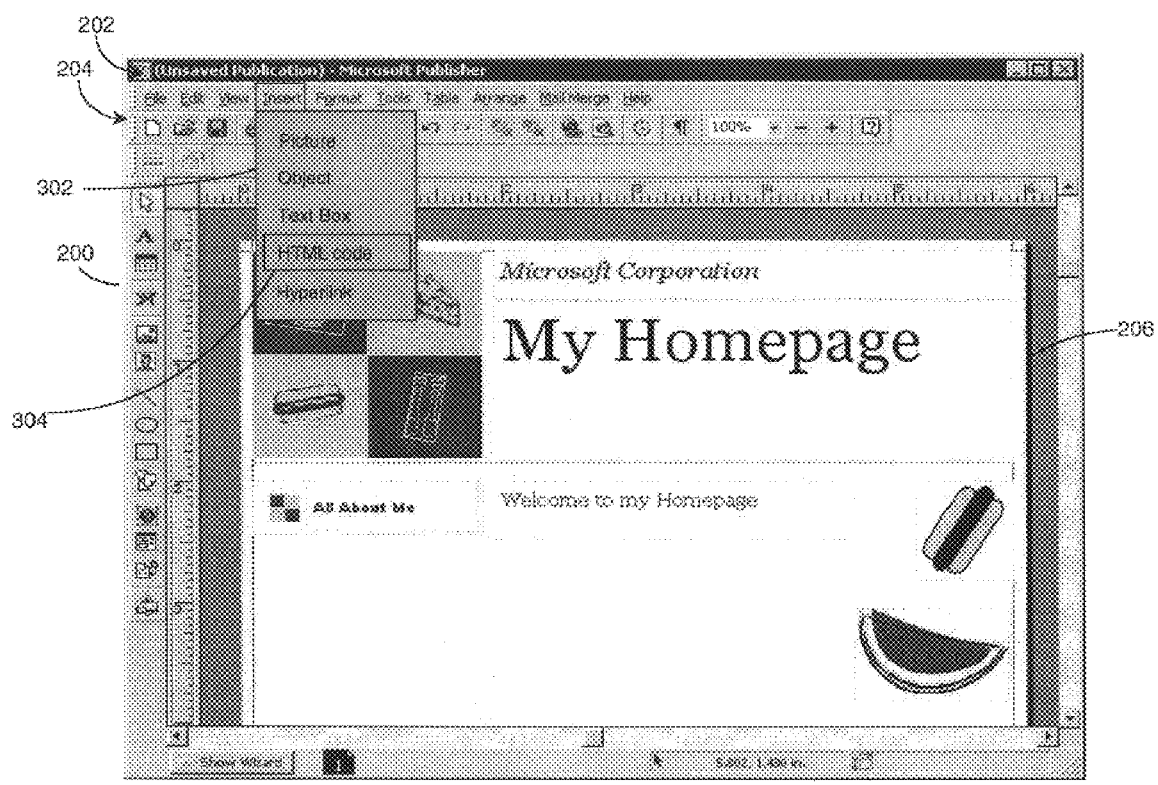
FIG. 3 is a screen display illustrating the Web Content Customization utility for selecting the insert HTML code option from a drop down menu.

FIG. 3 is an illustration of a typical screen display in Microsoft's PUBLISHER 2002 desktop publishing program illustrating how the user selects the command to inset interactive HTML object. The user selects the Insert option from the drop-down menu bar 204 using the pointing device 208. Upon selection of the Insert option, a drop-down window 302 appears with a list of various objects that may be inserted into the electronic file 206. For example, the user may insert a Picture, an Object, a Text Box, an HTML Fragment, or a Hyperlink. These elements are not meant to be an exhaustive list and those skilled in the art will appreciate that various other elements, such as Clip Art, video, and audio sounds may be inserted into the electronic file from the Insert drop-down menu 302. Using the pointing device, the user then selects the HTML Code option 304 from the Insert drop-down menu 302.

Figure 4:
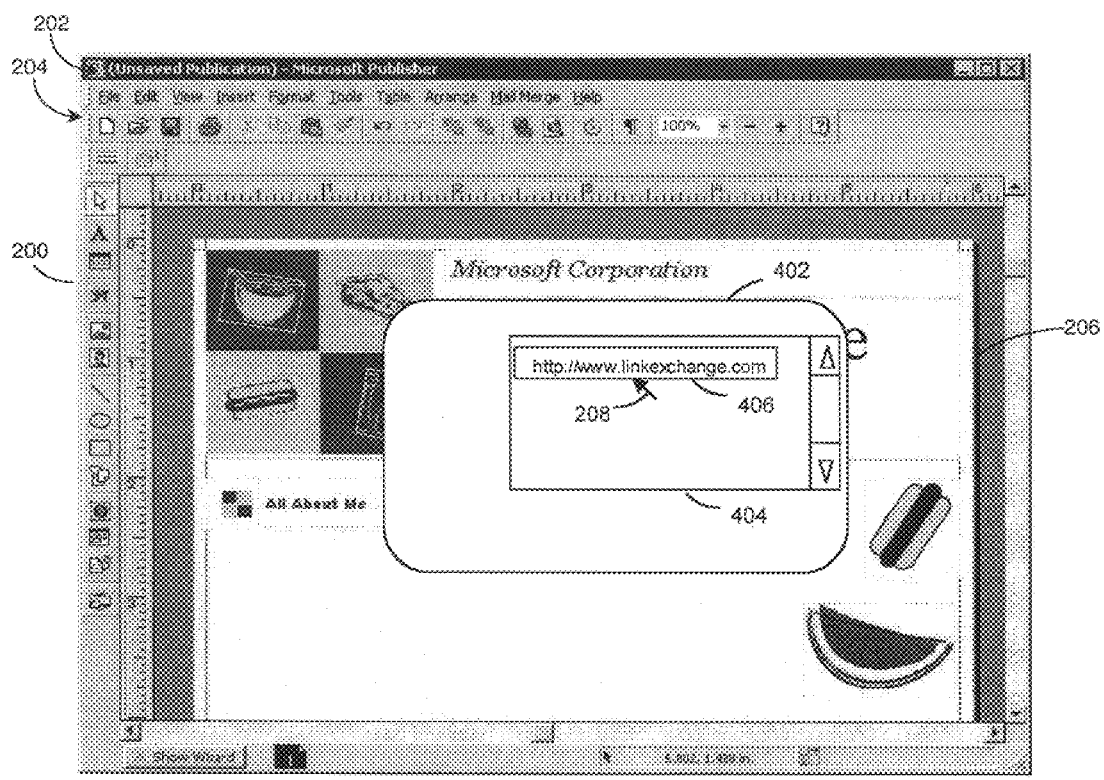
FIG. 4 is a screen display illustrating the Web Content Customization utility for selecting a URL associated with an HTML code service web site.

FIG. 4 is an illustration of the window 200 displaying the electronic file 210 and a dialog box 402 using the WCC utility 100. The dialog box 402 appears in response to the user selecting the HTML code selection 304 (FIG. 3). The dialog box 402 comprises a list box 404, which contains a list of the URLs associated with HTML code service web sites that the user may access to retrieve interactive HTML objects. Several of the URLs associated with the established HTML code service web sites may be "hard-coded" into the WCC utility 100 so that they always appear in the list box 404. Additionally, the list box may 404 also contain the URLs of each HTML code service site that the user has previously registered with. Furthermore, the user may at any time, manually edit the URLs in the list box 404, such as delete an entry or edit a specific entry using standard editing techniques. Additionally, the dialog box 402 may contain an address bar 406 so that the user may manually input the URL of an HTML code service web site that is not currently listed in the list box 404.

The WCC utility 100 then launches an HTML rendering engine, such as Microsoft's TRIDENT module, from within the web authoring tool. The web-authoring tool hosts the HTML rendering engine in the dialog box 402. Typically, the HTML rendering engine manages the basic functions of downloading and displaying web pages. For example, the HTML rendering engine downloads and opens the web page associated with the URL currently highlighted in the address bar 406 and displays it in the dialog. Having a web authoring tool host the HTML rendering engine in a dialog box 402 eliminates the need for the user to exit the web authoring tool and open a separate web browser application program to access the HTML code service web site. Thus, by allowing the web authoring tool to host an HTML rendering engine, such as TRIDENT, reduces the complexity for the user to insert interactive HTML objects into their web pages.

Figure 5:
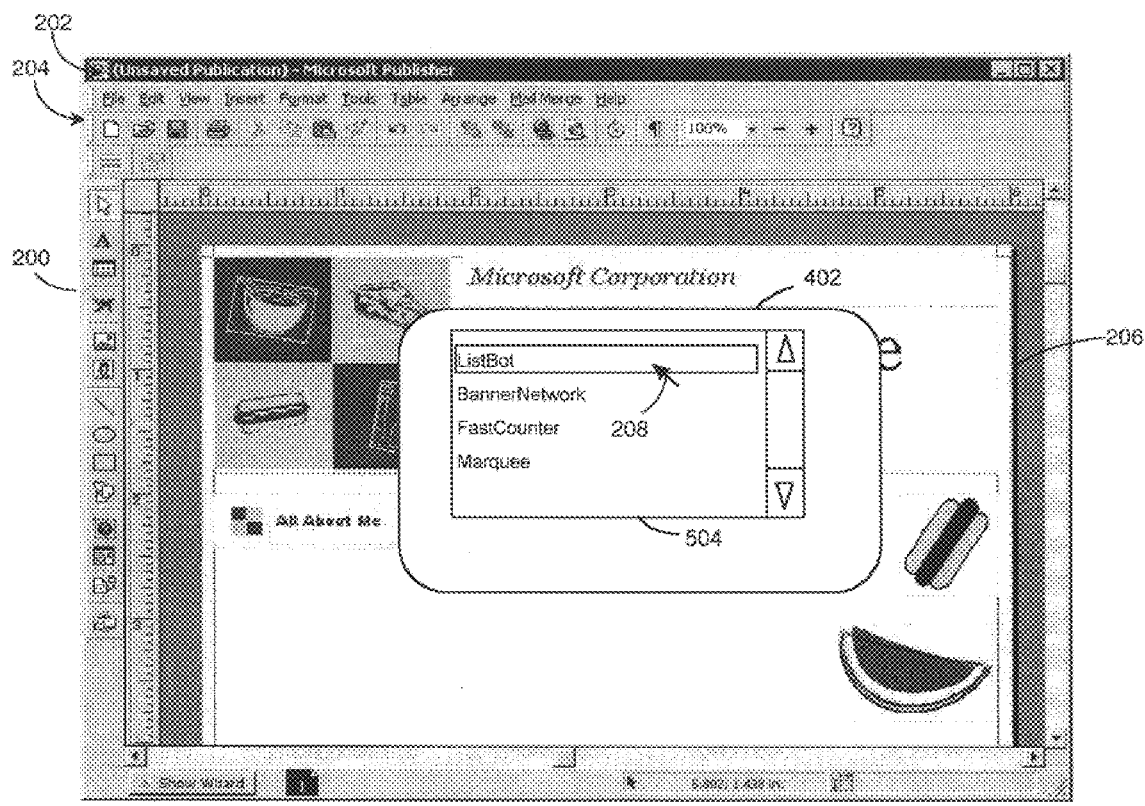
FIG. 5 is a screen display illustrating the Web Content Customization utility for displaying a selected interactive HTML object.

FIG. 5 is an illustration of the window 200 displaying the electronic file 210 and a dialog box 502 using the WCC utility 100. The dialog box 402 is opened in response to the WCC utility 100 receiving a user command to open an HTML code service web site. The dialog box 402 contains a first window 504, which displays a list of interactive HTML object that the user may choose to insert into their web page. The interactive HTML object that the user selects using the pointing device 212 is highlighted, thereby providing a visual indication interactive HTML object the user has selected to insert into the electronic file 210. For example, in the present illustration, the first window contains a ListBot, a FastCounter, a BannerNetwork, and a Marquee interactive HTML objects. The pointing device 212 is positioned over the ListBot object, which causes the selection to be highlighted, thereby indicating that the user has selected the ListBot interactive HTML object to insert into their web page 206.

Figure 5A:
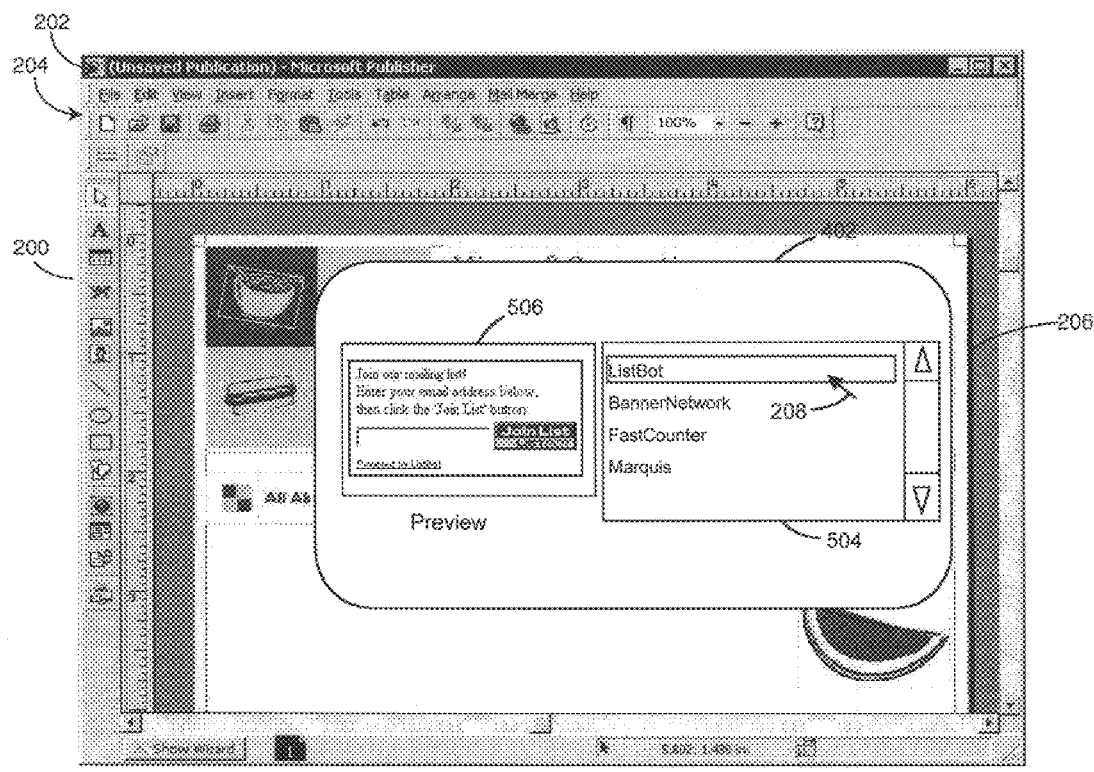
FIG. 5A is a screen display illustrating an alternative embodiment of the Web Content Customization utility for displaying a selected interactive HTML object.

FIG. 5A is an illustration of an alternative embodiment of the present invention. In the alternative embodiment, the dialog box 402 may also comprise a second window 506 that shows a graphical representation of the interactive HTML object, which is highlighted in the first window 504. The graphical representation is a preview of how the interactive HTML object will appear in the user's web page. Using the example from above, a preview of how the ListBot interactive HTML object will appear in the user's web page is displayed in the second window 506. Once the user is satisfied how the HTML object appears, the user uses the pointing device 212 to "double-click" on the selection. Although the selection of a interactive HTML object is described using a pointing device, such as a mouse, those skilled in the art will appreciate that other devices, such as the keyboard, a stylus pen, a trackball, or any other pointing device may be used without altering the scope of the invention.

Figure 6:
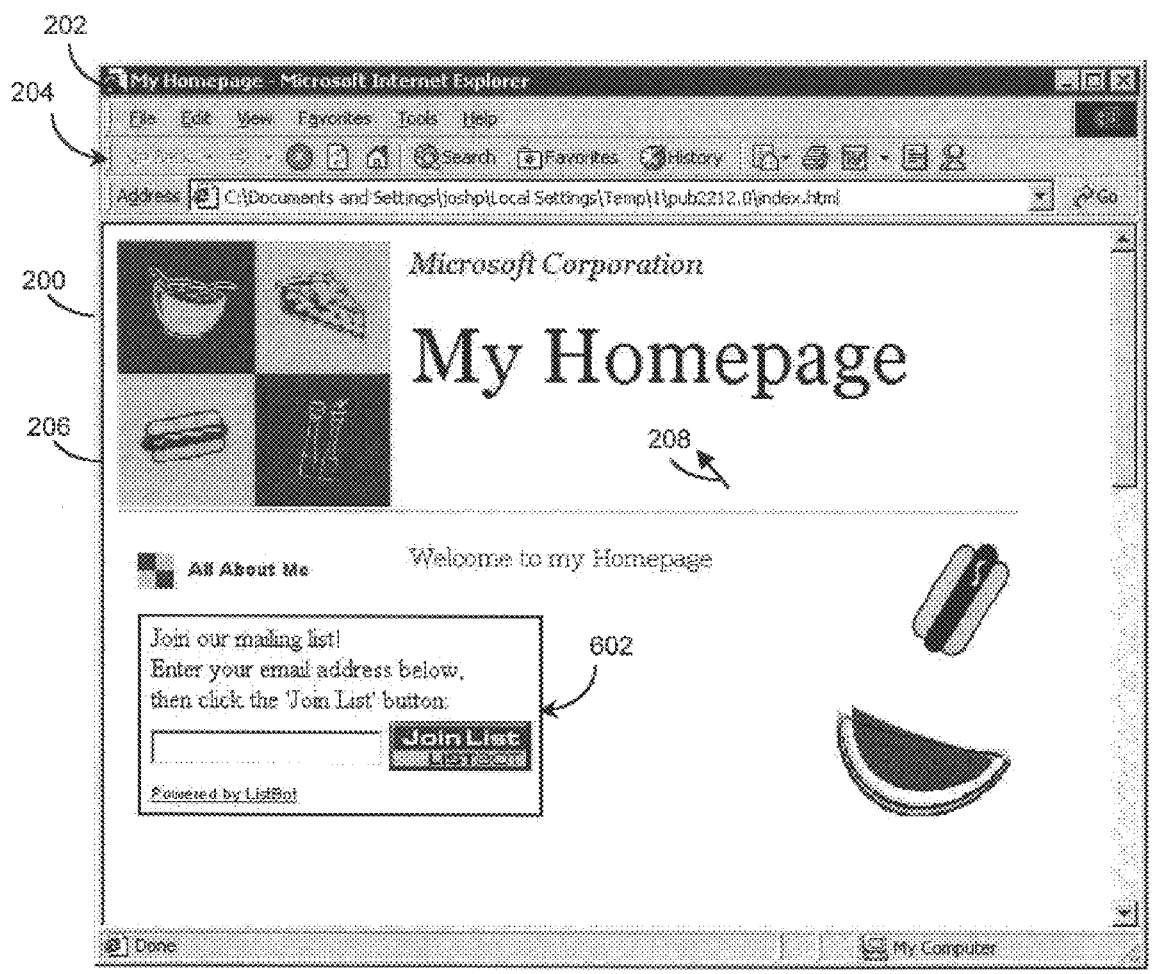
FIG. 6 is a screen display illustrating the final result after inserting the interactive HTML object in the HTML electronic file.

FIG. 6 is an illustration of the window 200 displaying the electronic file 210 after the user has selected the interactive HTML object from the dialog box 402 shown in FIG. 4. The electronic file 210 contains the new interactive HTML object 602 that the user selected in the pop-up dialog box 402. The HTML code associated with the interactive HTML object is automatically transmitted from the remote HTML code service web site to the web-authoring tool, which automatically inserts the HTML code associated with the interactive HTML object into the electronic file. The interactive HTML object that the user has selected automatically appears in the electronic file 206. The insertion of the HTML code into the electronic file 206 does not require any additional interaction on the part of the user. For example, the user does not have to manually cut and paste the HTML code into his web page or write the HTML code from scratch. The user only needs to select the desired interactive HTML object from the dialog box 402 (FIG. 4) and the HTML code is automatically downloaded into the electronic file 206. This provides an advantage over prior methods in that the user does not have to have any knowledge of HTML or server-side script programming to add interactive HTML object 602 to their web page. Returning to the above example, the illustration shows the ListBot interactive object 602 inserted into the electronic file 206.

Additionally, the WCC utility 100 may also return a URL that points to a web site for reconfiguring the interactive HTML object. Typically, as part of the registration process, the user answers a series of questions, which affect how the interactive object will look and behave in the user's web site. In order for the user to reconfigure the interactive object or update the interactive object, the user must access the corresponding web page. The WCC utility 100 retrieves the URL associated with the web page that contains the configuration data and saves the URL in a memory location. Furthermore, the WCC utility 100 may also retrieve the dimensions of the HTML interactive element from the HTML code server web site. The dimensions are directly imported into web authoring tool. Typically, the dimensions of the interactive object are described in terms of the number of pixels for both the width and height of the interactive object.

Figure 7:
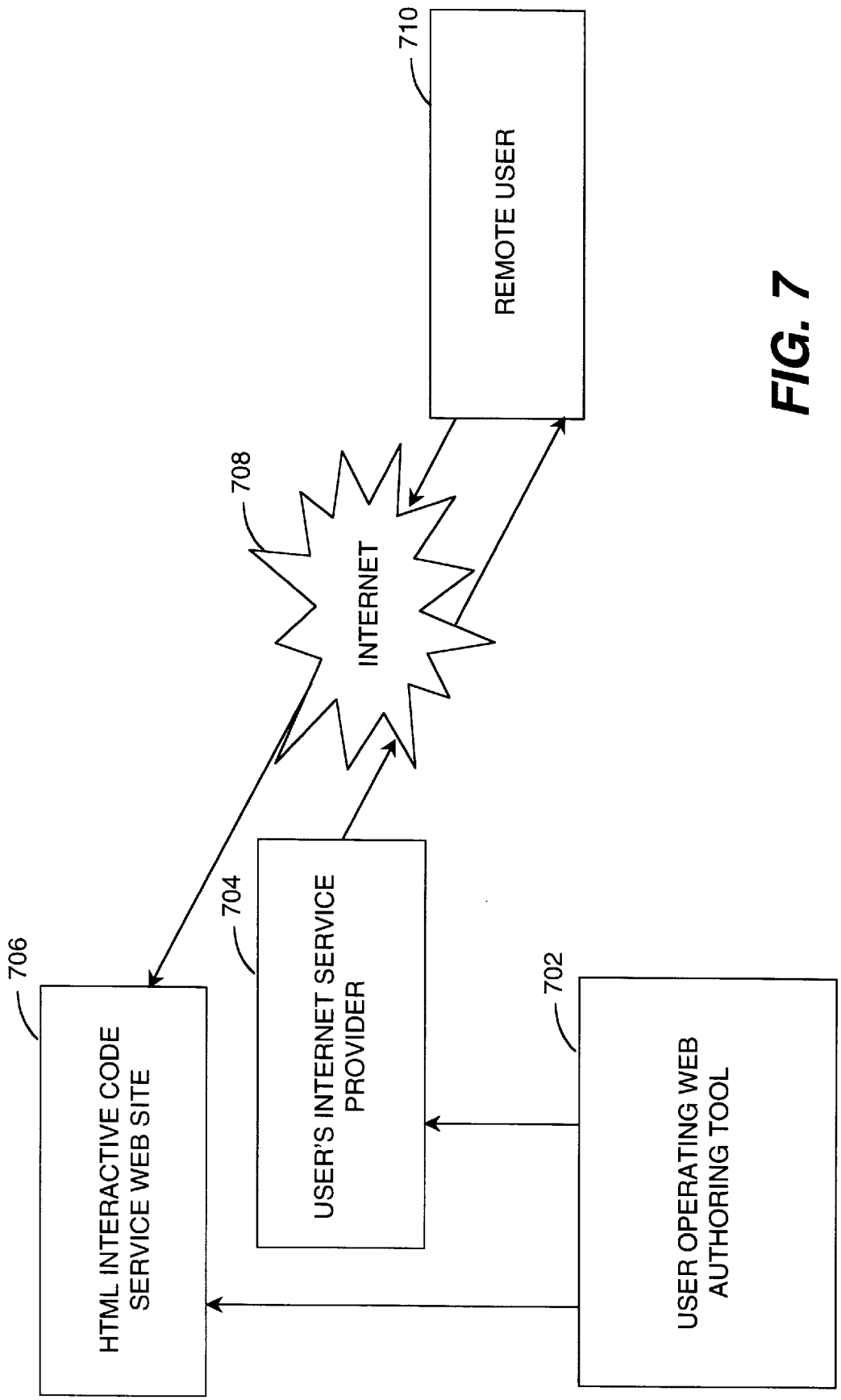
FIG. 7 is a block diagram illustrating the interoperability between the Web Content Customization utility and the remote HTML interactive remote server.

FIG. 7 is a block diagram illustrating the interaction between a user who creates a web page using a web authoring tool 702, the user's Internet Service Provider (ISP) 704, an HTML code service web site providing the interactive HTML document, 706 and a remote user 710 over the Internet 708. First, the user selects the option to insert an interactive HTML object into their web page. This activates the WEB Content Customization utility in PUBLISHER 2002, which launches an HTML rendering engine, such as the TRIDENT module. The TRIDENT module opens a remote HTML code service web site 706, such as LinkExchange. Next the WCC utility retrieves the registration web pages from the HTML interactive Code Service Web site 706. The interactive HTML object available at the HTML interactive Code Service Web site 706 is displayed in a dialog box within the web authoring tool 702. The user then decides whether they want to register for an interactive HTML object, such as ListBot or FastCounter. Once the registration process is complete, the WCC utility 100 automatically retrieves the HTML code associated with the selected interactive HTML object from the HTML interactive Code Service Web site 706. Next, the WCC utility 100 passes the HTML code to the web authoring tool 702, which causes the HTML interactive data content to be displayed in the user's web page. The user then uploads the newly created web page, which contains the customized HTML interactive data object, to their Internet Service Provider 704. Next, a remote user 710, browsing the Internet 708 selects the user's newly created web page on the user's ISP 704. The remote user 710 then may access the newly added interactive HTML object. Once the remote user 710 begins interacting with the interactive HTML object on the user's web page, any information provided by the remote user is transmitted to a standard script hosted on the HTML interactive Code Service Web Site 706, which then adds the information to the user's web page.

For example, suppose a user created a web page using Microsoft's PUBLISHER 2002 and wanted to add a ListBot feature to their web page. The user would first open the web page in PUBLISHER 2002 and select the option to insert HTML content from the drop down menu. This causes the WCC utility to launch the TRIDENT module in a dialog box running in PUBLISHER 20002. The WCC utility 100 then opens a list box containing a list of the interactive HTML object that the user can insert into their web page. Once the user selects the ListBot feature, the LinkExchange web site displays the registration page(s) specific to that particular ListBot feature. After the user completes registration process, the HTML code associated with the ListBot feature is automatically transferred between the LinkExchange web site and PUBLISHER. The ListBot feature contains a block of JAVA script that is executed by the TRIDENT module, which transfers the HTML content and instructs PUBLISHER how to insert the interactive HTML object. The user then simply saves the web page with the customized ListBot feature and posts their web page on the ISP server. Thus, there is no need for the user to have any knowledge of HTML or server-side script programming.

Once the transfer is complete, the ListBot feature appears on the user's web page open in PUBLISHER 2002. The new web page will automatically contain the customized ListBot feature provided by the LinkExchange web site. Once the web page is hosted by the ISP, a remote user may access the PUBLISHER-created web site and access the ListBot feature. After opening the user's web page, the remote user submits their e-mail address. The information is transmitted across the Internet to a standard server-side script hosted at the LinkExchange web site, which then automatically adds the new e-mail address to the user's customer mailing list in PUBLISHER.

Figure 8:
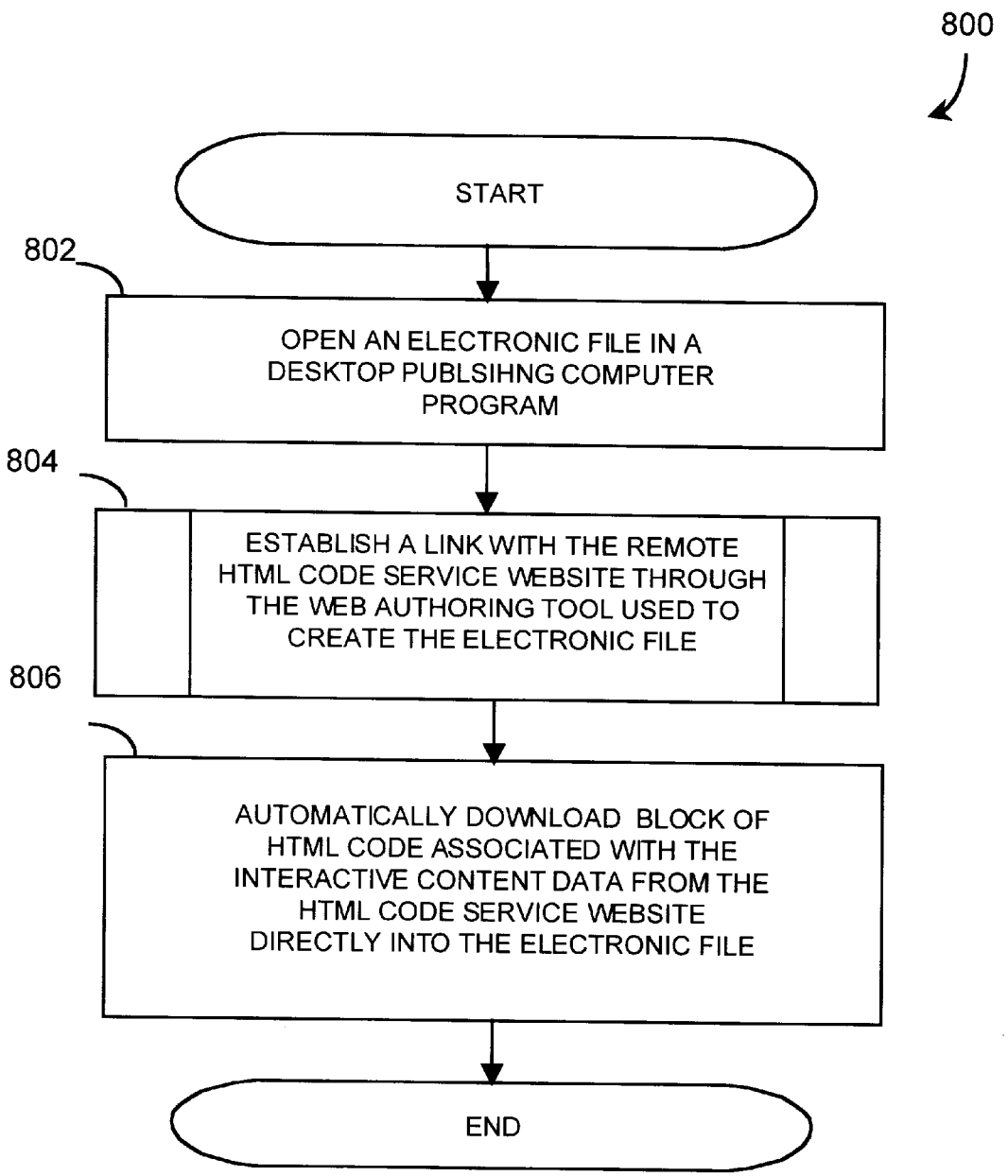
FIG. 8 is a logic flow diagram illustrating an exemplary technique for applying the Web Content Customization utility to an electronic file in a web-authoring tool.

FIG. 8 is a logic flow diagram illustrating routine 800 for applying the WEB Content Customization utility 100 (FIG. 1) to add a interactive HTML object to an electronic file 206 open in a web authoring tool. Those skilled in the art will appreciate that the logic flow diagram of FIG. 8 is executed by the processing unit 21 (FIG. 1) in response to instructions that have been incorporated into the WEB Content Customization utility 100.

The routine 800 begins at step 802, in which the user opens an electronic file 206 in a web authoring tool, and issues a command to insert an interactive HTML object into the electronic file. Typically, the web-authoring tool is a desktop publishing software program. However, those skilled in the art will appreciate that other application software application programs, such word processors or spreadsheet programs may be used to create web pages.

Step 802 is then followed by step 804, in which the WCC utility 100 establishes a link with a remote HTML code service web site. The remote HTML code service web site 702 is accessed through the web-authoring tool instead of through a separate web browser. This allows the user can access and retrieve interactive objects directly from the remote HTML code service web site without having to exit the web authoring tool and open a separate web browser program. Therefore, the number of steps required to add interactive HTML content is greatly reduced thereby simplifying the process of adding interactive content to a web page for the average web page developer.

Step 804 is followed by step 806, in which a bock of HTML code associated with the interactive HTML object is downloaded directly into the electronic file 206 from the HTML code service web site 702. The download process is controlled by a block of client-side script that is provided by the remote HTML code service web site. In addition to the block of HTML code, supporting files may also be directly downloaded into the electronic file. Supporting files may be video files, audio files, animation files, or the like, which are called by the block of HTML code to enhance the interactive HTML object. Step 806 is then followed by the "END" step.

Figure 9:
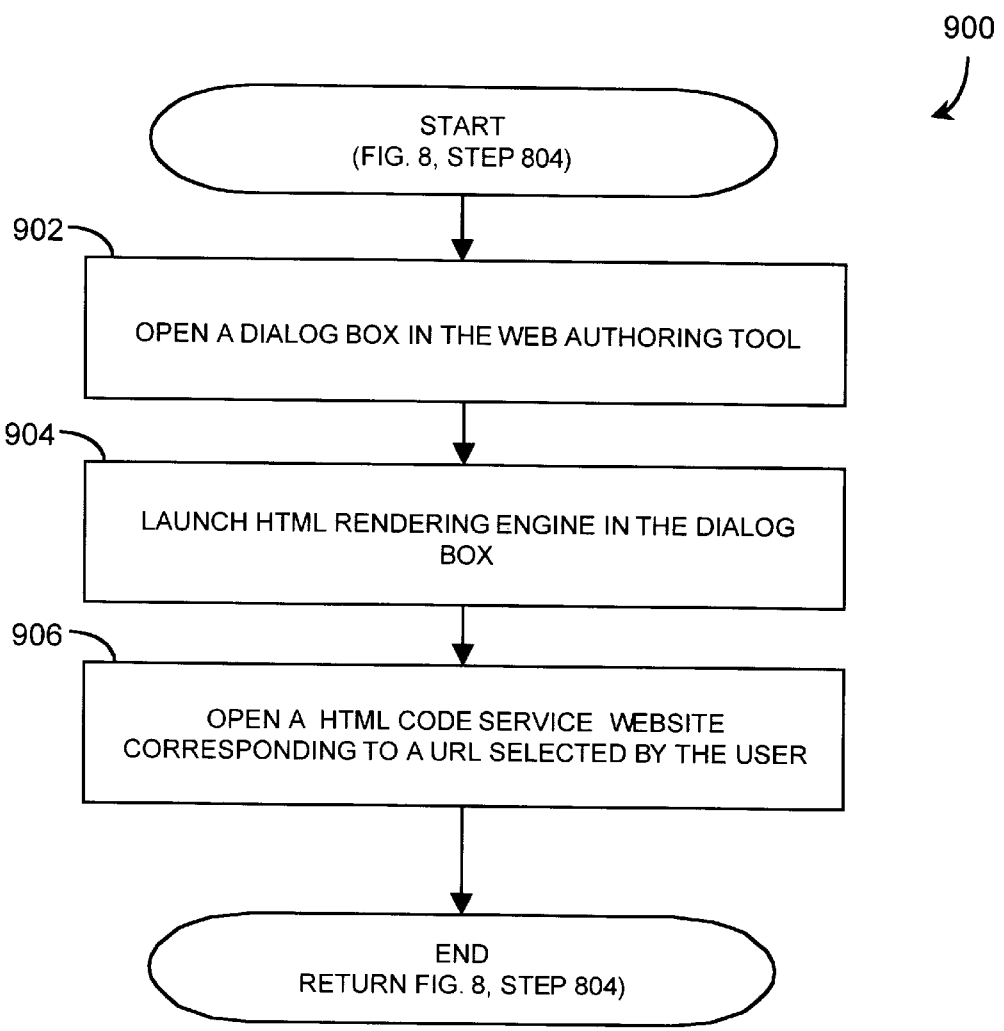
FIG. 9 is a logic flow diagram for establishing a link with the remote HTML code server web site.

FIG. 9 is a logic flow diagram illustrating routine 804 in FIG. 8, which the WCC utility 100 establishes a link to the HTML code service web site. Routine 804 begins at step 902, in which the WCC utility 100 opens a dialog box in the desktop publishing computer program.

Step 902 is followed by step 904, in which the WCC utility 100 launches an HTML rendering engine, such as Microsoft's TRIDENT module, within the dialog box. TRIDENT is an ActiveX control that manages the downloading, parsing, and displaying of web pages on a local computer. The TRIDENT module forms the core of web browser application programs, such as Microsoft's INTERNET EXPLORER and manages the basic functions of downloading and displaying web pages. Thus, only the basic functions of downloading and displaying web pages are run in the dialog box.

Step 904 is then followed by step 906, in which the WCC utility 100 opens the HTML code service web site that corresponds to the a URL selected by the user. Alternatively, the user may manually input the URL of the HTML code service web site in the opening screen in the dialog box 402. However, the user is also presented with a list box 504 in the first screen of the dialog box that contains a list of URLs associated with various HTML code service web sites. The user may select one of these URLs displayed in the URL window, as opposed to manually inputting the desired URL. Once the user enters a new URL associated with a new HTML code service web site, the WCC utility 100 stores the URL in a memory location. Then each time the WCC utility 100 is activated, each URL stored in the memory location is displayed in the URL window of the dialog box. Additionally, the URL of well-known HTML code service web sites, such as LinkExchange may be "hard coded" into the WCC utility 100. This allows novice web page authors, who may be unfamiliar with HTML web service code sites and where to locate them on the World Wide Web to be able to readily access interactive HTML objects and insert them into their web pages.

Once the user has selected a URL, the WCC utility 100 launches the HTML rendering engine in a dialog box within the web authoring tool and downloads a first page of the HTML code service web site associated with the selected URL. Once the user has selected an interactive HTML object, the web site then displays a series of registration pages for the user to respond to in order to receive the block of HTML code associated with the interactive HTML object selected by the user.

Once the registration process is complete, the WCC utility 100 activates a client-side script at the HTML code service web site. The client-side script is typically provided by the HTML code service web site hosting the interactive HTML object and is used by the web authoring tool to insert the block of HTML code associated with the interactive HTML object into the electronic file 206.

Normally, the client-side script is written using the JAVA script programming language. However, those skilled in the art will appreciate that other script programming languages, such as VBSCRIPT, may be used to create the server side scripts without altering the effect or scope of this invention.

The client-side script allows the web page to communicate directly with the web authoring tool via OLE automation. OLE automation is a well known mechanism used by used by scripts (such as those contained in web pages) to interact with other objects. The use of client-side script allows the block of HTML code associated with the interactive HTML object to be directly inserted into the user's web page, which is open in the web-authoring tool. The client-side script also controls how the interactive HTML object will be displayed. For example, the client-side script may contain dimensional information about the interactive HTML object. Specifically, the dimensional information included in the client-side script may consist of the size of the object, expressed in pixels, in both the horizontal and vertical dimensions. Thus, the dimensions of the interactive HTML object are passed directly to the web-authoring tool using OLE automation for use by the web-authoring tool in displaying the interactive HTML object. Lastly, after the WCC utility opens the HTML code service web site, step 906 is followed by the "END" step, which returns to step 804 of FIG. 8.

The present invention thus provides a method for inserting interactive HTML objects into an existing web page directly from a web authoring tool such as a desktop publishing computer program, without requiring the user to have any prior knowledge of HTML or script programming.

It should be understood that the foregoing pertains only to the preferred embodiments of the present invention, and that numerous changes may be made to the embodiments described herein without departing from the spirit and scope of the invention.

We claim:

1. A method for inserting an interactive HTML object selected from a plurality of interactive HTML objects stored at a remote location into an electronic file open in a web authoring tool, wherein each interactive HTML object is associated with a block of HTML code, comprising the steps of:

opening the electronic file;

receiving a user command to insert an interactive HTML object into the electronic file; and in response to receiving a single user command to insert an interactive HTML object, performing the sequence comprising the steps of:

retrieving a URL address associated with the remote location from a memory location;

establishing a link with the remote location associated with the URL;

receiving a user command selecting at least one interactive HTML object from the plurality of interactive HTML objects;

retrieving the block of HTML code associated with the interactive HTML object from the remote site; and inserting the block of HTML code associated with the interactive HTML object into the electronic file open in the web authoring tool.

2. The method of claim 1, wherein the step of establishing a link with the remote site, comprises:

opening a dialog box in the web authoring tool;

launching an HTML rendering engine in the dialog box;

opening the remote site inside the rendering engine.

3. The method of claim 2, wherein the step of retrieving the block of HTML code associated with the interactive HTML object from the remote site, comprises:

displaying the plurality of interactive HTML objects in the dialog box;

receiving a user command selecting at least one of the plurality of interactive HTML objects; and transferring the block of HTML code associated with the selected interactive HTML object from the remote location to the electronic file open in the web authoring tool.

4. The method of claim 2, further comprising storing a URL associated with the interactive HTML object in a memory location associated with the web authoring tool.

5. The method of claim 2, wherein the dialog box comprises a window displaying a plurality of interactive HTML objects that the user can transfer from the remote site.

6. The method of claim 2, further comprising activating a block of script associated with the interactive HTML object, wherein the block of script is operable for communicating with the web authoring tool and automatically transferring the block of HTML code associated with the HTML interactive element directly to the electronic file open in the web authoring tool.

7. A method for inserting an interactive HTML object selected from a plurality of interactive HTML objects stored at a remote location into an electronic file open in a web authoring tool, wherein each interactive HTML object is associated with a block of HTML code, comprising the steps of:

opening the electronic file;

receiving a user command to insert an interactive HTML object into the electronic file; and in response to receiving a single user command to insert an interactive TML object, performing the sequence comprising the steps of:

retrieving a URL address associated with the remote location from a memory location;

establishing a link with the remote location associated with the URL comprising the steps of opening a dialog box in the web authoring tool, launching an HTML rendering engine in the dialog box, and opening the remote site inside the rendering engine;

selecting at least one interactive HTML object from the plurality of interactive HTML objects;

retrieving the block of HTML code associated with the interactive HTML object from the remote site; and automatically inserting the block of HTML code associated with the interactive HTML object into the electronic file.

8. The method of claim 7, wherein the step of retrieving the block of HTML code associated with the interactive HTML object from the remote site, comprises:

displaying the plurality of interactive HTML objects in the dialog box;

receiving a user command selecting at least one of the plurality of interactive HTML objects; and transferring the block of HTML code associated with the selected interactive HTML object from the remote location to the web authoring tool.

9. The method of claim 7, further comprising activating a block of script associated with the interactive HTML object, wherein the block of script is operable for communicating with the web authoring tool and automatically transferring the block of HTML code associated with the HTML interactive element directly to the electronic file open in the web authoring tool.

10. A computer-readable medium containing computer-executable instructions for performing the method for inserting an interactive HTML object selected from a plurality of interactive HTML objects stored at a code service web site into web page open in a web authoring tool, wherein each interactive HTML object is associated with a block of HTML code, the method comprising the steps of:

receiving a user command to insert an interactive HTML object into the web page; and in response to receiving a single user command to insert an interactive HTML object, performing the sequence comprising the steps of:

retrieving a URL address associated with the code service web site from a memory location;

downloading a first page of the code service web site into a dialog box open in the web authoring tool, wherein the first page displays the plurality of interactive HTML objects;

receiving a user command selecting at least one interactive HTML object;

automatically downloading the block of HTML code associated with the interactive HTML object in the web page open in the web authoring tool; and displaying the interactive HTML object in the web page open in the web authoring tool.

11. The computer-readable medium of claim 10, wherein the step of downloading the first page of the code service web site comprises:

opening a dialog box in the web authoring tool;

launching an HTML rendering engine in the dialog box; and displaying the plurality of interactive HTML objects that the user can download from the remote site.

12. The computer-readable medium of claim 10, wherein the step of automatically downloading the block of HTML code associated with the interactive HTML object comprises activating a block of script associated with the interactive HTML object, wherein the block of script is operable for communicating with the web authoring tool and automatically transferring the block of HTML code associated with the HTML interactive element directly to the web page open in the web authoring tool.

13. The computer-readable medium of claim 10, wherein the step of automatically downloading the block of HTML code associated with the interactive HTML object comprises downloading a supporting file associated with the selected interactive HTML object selected from the group consisting essentially of a movie file, a sound file, and an automation file.

* * * * *

UNITED STATES PATENT AND TRADEMARK OFFICE
CERTIFICATE OF CORRECTION

PATENT NO. : 6,493,733 B1
DATED : December 10, 2002
INVENTOR(S) : Joshua Michael Pollock et al.

It is certified that error appears in the above-identified patent and that said Letters Patent is hereby corrected as shown below:

Column 15,
Line 33, "TML" should read -- HTML --.

Column 16,
Line 13, "into web" should read -- into a web --.

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,493,733 B1
DATED : December 10, 2002
INVENTOR(S) : Joshua Michael Pollock et al.

It is certified that error appears in the above-identified patent and that said Letters Patent is hereby corrected as shown below:

<u>Title page,</u>
Item [12], "Pollack et al." should read -- Pollock et al. --.
Item [75], "Pollack" should read -- Pollock --.

Signed and Sealed this

Sixth Day of January, 2004

JAMES E. ROGAN
*Director of the United States Patent and Trademark Office*